16,293
ORGANO-LEAD COMPOUNDS OF
ETHYLENE GLYCOLS
Albert P. Giraitis, Paul Kobetz, and Hymin Shapiro, Baton Rouge, La., assignors to Ethyl Corporation, New York, N.Y., a corporation of Virginia
No Drawing. Filed Apr. 27, 1962, Ser. No. 190,810
2 Claims. (Cl. 260—437)

This invention relates to a new and novel class of organo-metallic compounds and to the method of their preparation. In particular, the invention reates to new and novel organo tin and organo lead compounds.

The present compounds are useful as biocides, insecticides, and as antiknocks for gasoline. These compounds are also suitable as stabilizers for vinyl halide polymers, as, for example, polyvinyl chloride homopolymers and copolymers. Of these compounds, those containing tin are especially effective, though those compounds containing lead are particularly preferred from the cost effectiveness standpoint. All of these materials, however, are effective as polymer stabilizers even to very high temperatures and can be employed for conventional resin mixes and for plastisols and organosols. Certain of these compounds are also useful as monomers for the production of plastics.

The new and novel compounds of this invention comprise the reaction products of organo tin halides or organo lead halides with derivatives of ethylene glycol or polyethylene glycols wherein the hydrogen of one terminal hydroxyl group of the glycols has been replaced by an alkali metal, and the hydrogen of not more than one of the terminal hydroxyl groups has been replaced by an organo group. The organo tin and organo lead halides are compounds containing at least 1 but not more than 3 halide atoms bonded directly to the tin or lead atom and at least 1 but not more than 3 organo radicals, a carbon atom of each of which is bonded directly to the tin or lead atom. The ethylene glycol or polyethylene glycol derivative is a compound containing 1 or more ethylene groups separated, if at least two groups are present, by oxygen atoms, and at least one terminal oxygen atom is bonded directly to an alkali metal.

The novel reaction products are formed by condensation of the moieties remaining after simultaneous cleavage of a halide atom from the tin lead atom of the organo metal halide and an alkali metal from an oxygen atom of the ethylene glycol or polyethylene glycol derivative. In this reaction the oxygen atom of the ethylene glycol or polyethylene glycol from which an alkali metal is cleaved becomes bonded directly to the metal of the organo metal halide, while the displaced alkali metal reacts with the displaced halide of the organo metal halide to form an alkali metal halide salt.

These new and novel compositions are thus compounds of the general formula $$R_yM[O(C_2H_4O)_mR']_{4-y}$$

which are formed by contacting together, at a suitable temperature of from about 30° C. to about 150° C., a compound having the general formula $$R_yMX_{4-y}$$

and a compound having the general formula $$M'O[C_2H_4O]_mR'$$

wherein, in these compounds, R is a monovalent organic radical containing up to about 18 carbon atoms; and preferably a monovalent hydrocarbon radical containing up to about 12 carbon atoms; M is a Group IV–A metal having an atomic weight greater than 100; X is halogen; y is an integer of from 1 to 3; M' is an alkali metal; m is an integer from 1 to about 10; and R' is selected from the group consisting of hydrogen and monovalent organic radicals containing up to about 18 carbon atoms, preferably monovalent hydrocarbon radicals containing up to about 12 carbon atoms.

The organo metal halide reactant $$R_yMX_{4-y}$$

is thus a compound represented by any of the general formulas $RMX_3$, $R_2MX_2$, and $R_3MX$ wherein R is a monovalent organic radical containing up to about 18 carbon atoms, and preferably a monovalent hydrocarbon radical containing up to about 12 carbon atoms; M is a Group IV–A metal of atomic weight greater than 100—e.g., tin or lead; and X is halogen—fluorine, chlorine, bromine or iodine. Illustrative of such compounds are such triorgano tin compounds as trimethyltin fluoride, triethyltin chloride, tri-tert-butyltin chloride, triisoamyltin iodide, dibutyl vinyltin iodide, tritetradecyltin chloride, trioctadecyltin chloride, triphenyltin bromide, tricyclohexyltin iodide, tri-p-tolyltin chloride, phenyl divinyltin chloride, benzyl butylphenyltin fluoride, tris-(bromomethyl)tin bromide, cis-tris(2-chlorovinyl)tin chloride, (5-bromoamyl)diethyltin bromide; such diorgano tin compounds as di-tert-butyltin dichloride, ethyl methyltin dichloride, didodecyltin dichloride, dicyclohexyltin diiodide, diphenyltin chloride iodide, di-2,5-xylyltin dibromide, phenyl vinyltin dichloride, bis(bromoethyl)tin dibromide, bis(p-bromophenyl)tin dibromide; such monoorgano tin compounds as vinyltin tribromide, butyltin trichloride, octyltin trichloride, phenyltin tribromide, p-tolyltin trichloride, (p-bromophenyl)tin tribromide, (o-carbomethoxy phenyl)tin trichloride, p-(dichloroiodo)phenyltin trichloride. The corresponding organo lead halide compounds, whether the organo radicals are substituted or unsubstituted, are also suitable for the practice of this invention. Examples of such compounds are such triorgano lead halides as trimethyllead fluoride, triethyllead chloride, triisopropyllead bromide, triisopropyllead iodide, trihexadecyllead chloride, trioctadecyllead chloride, triphenyllead chloride, tri-(p-bromophenyl)lead chloride, tri-(p-methoxy phenyl)lead bromide; such diorgano lead dihalides as dimethyllead dichloride, diisopropyllead dibromide, dioctadecyllead dichloride, diphenyllead dichloride, di-o-anisyllead dichloride, di-p-carboethoxylead dichloride; such organo lead trihalides as ethyllead trichloride, octyllead trichloride, octadecyllead trichloride, phenyllead trichloride, benzyllead tribromide, p-methoxy phenyllead trichloride.

The second reactant, the ethylene or polyethylene glycol derivative $$M'O[C_2H_4O]_mR'$$

is a compound containing one or more ethoxy or ethyleneoxy groups $$-[CH_2-CH_2-O]-$$

These groups in themselves do not actually participate in the reaction and therefore there can be any number of such groups within the polyethylene glycol derivative used in the reaction. Generally, however, such compounds do not contain more than about 10 such groups. Most preferred of these compounds are those containing from 1 to 3 of such groups. Further, because the ethyleneoxy groups themselves do not actually participate in the reaction, it is understood that such groups can be substituted to the extent that the substituted groups remain substantially inert in the principal reaction. Thus, one or more of the hydrogens of the ethyleneoxy group or groups can be replaced, for example, by similar or dissimilar organo radicals. Illustrative of such organo radicals are the monovalent hydrocarbon radicals methyl, ethyl, isopropyl, octyl, nonyl, decyl, and the like. Alkoxy groups, such as methoxy, ethoxy, butoxy, and the like, also provide substantially inert substituents; as also do the halides and various pseudo halides, including hydroxy, cyanate, isocyanate and thiocyanate groups, and the like. As stated, M' is an alkali metal and can be any metal from Group I–A of the Periodic Chart of the Elements (Fisher Scientific Company, 1955), though the most preferred, for reasons of economy, are lithium, sodium and potassium. The R' is an organo monovalent radical containing up to about 18 carbon atoms; and preferably is a monovalent hydrocarbon radical containing up to about 12 carbon atoms.

To prepare these polyethylene glycol alkali metal derivatives various methods are used; for example, ethylene glycols or glycolic ethers containing one replaceable hydrogen on a terminal hydroxyl group are reacted directly with an alkali metal. Illustrative of the most preferred glycol ethers which can be used for the preparation of the polyethylene glycol alkali metal derivative are ethylene glycol monomethyl ether, ethylene glycol monobutyl ether, ethylene glycol monohexyl ether, ethylene glycol monodecyl ether, diethylene glycol monomethyl ether, diethylene glycol monoethyl ether, diethylene glycol monobutyl ether, triethylene glycol monomethyl ether, triethylene glycol monoethylether, 1-butoxyethoxy-2-propanol. Other compounds suitable for the preparation of the polyethylene glycol alkali metal derivative are tetraethylene monobutyl ether, tetraethylenedihexyl ether, pentaethylene glycol monoethyl ether, pentaethylene glycol dibutyl ether, hexaethylene glycol monohexyl ether, hexaethylene glycol dioctyl ether, decaethylene glycol monoethyl ether, decaethylene glycol diethyl ether.

The second reactant $$M'O[C_2H_4O]_mR'$$

is thus an alkali metal derivative of a monoalkylether of ethylene glycol or polyethylene glycols. Examples of such compounds are ethylene glycol sodium monobutyl ether, ethylene glycol lithium monohexyl ether, ethylene glycol potassium monobutyl ether, diethylene glycol sodium monobutyl ether, diethylene glycol lithium monobutyl ether, triethylene glycol sodium monobutyl ether, tetraethylene glycol potassium monobutyl ether, pentaethylene glycol potassium monobutyl ether, hexaethylene glycol sodium monobutyl ether, decaethylene glycol sodium monobutyl ether.

Particularly preferred compounds as stabilizers for polyvinyl halides, because of their high cost effectiveness, are the trimethyllead monomethyl ether of diethylene glycol and the triethyllead monomethyl ether of diethylene glycol.

The following non-limiting examples are illustrative of the present invention. All parts and proportions in these examples are by weight except as otherwise specified.

EXAMPLE I

*Preparation of Trimethyllead Monomethyl Ether of Ether of Diethylene Glycol*

A mono sodium derivative of diethylene glycol dimethyl ether (sodium methyl carbitol), $$NaO[C_2H_4O]_2CH_3$$

was prepared by reacting excess sodium metal with methyl Carbitol dissolved in toluene. After the reaction was complete, the excess or unreacted sodium was filtered from the solution.

To 17.8 parts of sodium methyl Carbitol, dissolved in toluene, and contained within a reaction vessel, was added 36 parts of trimethyllead chloride. The trimethyllead chloride, it was observed, was insoluble in the toluene while the sodium methyl Carbitol was completely in solution.

The contents of the reaction vessel were heated to reflux and reflux continued for a period of 25 minutes. During this time the trimethyllead chloride solubilized and a precipitate was simultaneously formed. At the end of this reaction period the precipitate, weighing approximately 7 parts, was removed by filtration from the reaction products. The liquid contents of the vessel, 38.7 parts, had the characteristics of a viscous oil.

Analysis of the viscous oil, after removal of essentially all of the toluene, showed the reaction product to be the trimethyllead derivative of the monomethyl ether of diethylene glycol, $(CH_3)_3PbO[C_2H_4]_2CH_3$. The product was obtained in almost 100 percent yield, as shown by formation of sodium chloride.

EXAMPLE II

*Preparation of Trimethyllead Monomethyl Ether of Diethylene Glycol*

When the above example was repeated in all details except that 20 parts of triethyllead chloride was reacted with 8 parts of sodium methyl Carbitol, a generally similar reaction was obtained. Distillation under vacuum of the liquid portion of the reaction mass after filtration removed most of the toluene and left a residual viscous liquid weighing 24.3 parts.

Analysis of the viscous liquid showed that the product was triethyllead monomethyl ether of diethylene glycol, $(C_2H_5)_3PbO[C_2H_4O]_2CH_3$.

EXAMPLE III

*Preparation of Triphenyltin Monomethyl Ether of Tetraethylene Glycol*

20 parts of triphenyltin bromide and 10 parts of the sodium salt of the monomethyl ether of tetraethylene glycol are added to 100 parts of benzene and heated at reflux, within a glass lined reaction vessel, for one-half hour. Sodium bromide is precipitated during this period while the product which is formed in the reaction is soluble.

The slurry from the reaction vessel is filtered to remove the sodium bromide. The liquid is distilled under vacuum to remove the benzene. The residual product is found to be triphenyltin monomethyl ether of tetraethylene glycol, $\phi_3SnO[C_2H_4O]_4CH_3$.

EXAMPLE IV

*Preparation of Ethyl Methyltin Bis(Monomethyl Ether of Triethylene Glycol)*

20 parts of ethyl methyltin dichloride and 22.3 parts of the sodium salt of the monomethyl ether of triethylene glycol are added to 100 parts of toluene and charged to a reaction vessel. The contents of the vessel are heated at reflux for 1 hour after which time the solids of the resultant slurry are filtered off from the liquid. Toluene is removed from the product liquid by distillation under vacuum. The product is found to be ethyl methyltin bis(monomethyl ether of triethylene glycol), $(C_2H_5)(CH_3)Sn[O(C_2H_4O)_3CH_3]_2$.

EXAMPLE V

*Preparation of Diphenyllead Bis (Monomethyl Ether of Ethylene Glycol)*

20 parts of diphenyllead dichloride and 8.8 parts of the sodium salt of monomethyl ether of ethylene glycol, $NaOC_2H_4OCH_3$, are charged, with 200 parts of benzene, into a reaction vessel. The contents of the vessel are heated at reflux for approximately 1 hour.

The slurry from the reaction vessel is charged to a filter wherein the solids are separated from the liquids. The liquid product is heated under vacuum to remove excess benzene.

Analysis of the residual product shows the compound to be the diphenyllead bis(monomethyl ether of ethylene glycol), $\phi_2Pb[OC_2H_4OCH_3]_2$.

EXAMPLE VI

*Preparation of Dioctyllead Bis (Monoethyl Ether of Octaethylene Glycol)*

10 parts of dioctyllead dichloride are reacted with 16.7 parts of the sodium salt of the monoethyl ether of octaethylene glycol, $NaO[C_2H_4O]_8C_2H_5$, in the presence of 80 parts of benzene at reflux conditions. The resultant slurry is filtered and the residual liquid is distilled under vacuum to yield a product which is found to be dioctyllead bis (monoethyl ether of octaethylene glycol), $(C_8H_{17})_2Pb[O(C_2H_4O)_8C_2H_5]_2$.

EXAMPLE VII

*Preparation of Phenyllead Tris (Monomethyl Ether of Pentaethylene Glycol)*

10 parts of phenyllead tribromide are reacted with 16.6 parts of the sodium salt of monomethyl ether of pentaethylene glycol within a refluxing medium of 200 parts of commercial grade xylene. The contents of the vessel are refluxed for 1 hour after which time the resultant slurry is filtered and the liquid product distilled under vacuum. The residual liquid, after distillation, is found to be phenyllead tris (monomethyl ether of pentaethylene glycol), $\phi Pb[O(C_2H_4O)_5CH_3]_3$.

EXAMPLE VIII

*Preparation of p-Methoxy Phenyllead Tris (Monomethyl Ether of Pentaethylene Glycol)*

10 parts of p-methoxy phenyllead tribromide are reacted with 15.9 parts of the lithium salt of monomethyl ether of pentaethylene glycol within a reaction vessel. The reaction mixture is refluxed for 1 hour in 200 parts of toluene.

The resultant slurry is filtered and the liquids subjected to vacuum distillation to remove all of the excess toluene. The resultant liquid is found to be p-methoxy phenyllead tris (monomethyl ether of pentaethylene glycol), $(CH_3O\phi)Pb[O(C_2H_4O)_5CH_3]_3$.

From the foregoing examples and description it is apparent that the present invention is broadly applicable to the preparation of numerous organo tin and organo lead compounds and thus is entitled to broad scope in accordance with the spirit and teaching of this application.

Pursuant to this invention, then, an organo tin or organo lead halide is reacted with an alkali metal monoalkyl ether of ethylene glycol or polyethylene glycol. In the reaction, the said terminal alkali metal, reacts with a halide group or groups of the organo tin or organo lead halide to release an alkali metal halide salt while the remaining organo tin or organo lead moiety attaches to the oxygen, or oxygens, from which the alkali metal atom or atoms has been cleaved. The $R_3MX$ molecule will thus react with one molecule of a mono alkali metal derivative of an ethylene glycol or ether; the $R_2MX_2$ molecule will react with two molecules of a mono alkali metal derivative of an ethylene glycol or ether; and the $RMX_3$ molecule will react with three molecules of a mono alkali metal derivative of an ethylene glycol or ether.

As stated, a wide variety of organo tin and organo lead halides are suitable as reactants in the practice of this invention. Examples of the organo tin halides are such triorgano tin halides as tributyltin chloride, tri-tert-butyltin fluoride, allyl dibutyltin bromide, ethyl methyl propyltin iodide, trioctyltin chloride, tribenzyltin bromide, tri-o-tolyltin bromide, tri-2,5-xylyltin bromide, tri-2,4-xylyltin fluoride, hexyl diphenyltin bromide, diphenyl-(2-phenyl ethyl)tin iodide, tris(p-carbethoxy phenyl)tin chloride, tris(o-chlorobenzyl)tin fluoride, tris(p-fluorophenyl)tin bromide, tris(p-methoxy phenyl)tin fluoride; such diorgano tin dihalides as di-tert-amyltin diiodide, divinyltin difluoride, ethyl propyltin dichloride, dibenzyltin diiodide, diphenyltin bromide chloride, di-p-tolyltin dibromide, benzyl phenyltin dibromide, bis(p-chlorophenyl)tin dibromide; and such organo tin trihalides as allyltin tribromide, o-tolyltin trichloride, (p-bromophenyl)tin trichloride, (p-chlorophenyl)tin trichloride. Other suitable organo tin compounds are also given, for example, in "Organotin Compounds," Robert K. Ingham, reprinted from October 1960 issue of "Chemical Reviews," published by The American Chemical Society, at pages 480–487. Examples of triorgano lead halides suitable for the practice of the present invention are triethyllead bromide, trihexyllead chloride, tritetradecyllead chloride, tricyclohexyllead chloride, tribenzyllead chloride; such diorgano lead dihalides as diethyllead dichloride, dioctyllead dichloride, dibenzyllead dichloride; and such organolead trihalides as methyllead trichloride, octadecyllead trichloride, phenyllead trichloride. Other organo lead compounds are also described in "The Chemistry of Organo Compounds," by Rochow, Hurd and Lewis, copyrighted 1957 by John Wiley and Sons, at page 195. Of these organo tin and organo lead halides, the organo lead halides are most preferred from a cost effectiveness standpoint, especially the organo lead chlorides; and particularly those compounds containing up to 3 organo substituents and up to 2 halogen substituents in the molecule because these compounds are the most readily available and can be produced in good yield.

As to the alkali metal derivatives of the ethylene glycols, or ethers, the most preferred compounds are those containing sodium in the molecule because these compounds are produced more economically and in good yield. It is understood however that the introduction of any of the alkali metals into the compound, particularly lithium and potassium, also provides very good results and can be used economically.

In carrying out these reactions, the concentration of the reactants is not particularly critical. Preferably, however, the reactants are employed in stoichiometric quantities, though in general an excess of from about 0.5 to 3 moles of reactant can be provided, per mole of the other reactant.

The reactions can be carried out with or without a solvent, though a solvent is preferred. Preferably, the solvent employed should be one which will at least partially dissolve at least one of the reactants and the solvent should be substantially inert in the reaction. Preferably also, the solvents employed should have a boiling point above that of the reactants or the product obtained under the conditions of reaction. Obviously, numerous solvents are capable of use in this invention.

Suitable solvents are, for example, aliphatic hydrocarbons such as hexane, heptane, octane, cyclooctane; aromatic hydrocarbons such as methyl naphthalene, 1,2-dimethyl naphthalene, 4-ethyl toluene, mesitylene, o-terphenyl; halogenated hydrocarbons such as methylene chloride, chloroform, methyl chloroform, trichloroethylene, tetrachloroethylene; ethers such as ethyl ether, isopropyl ether, butyl ether, hexyl ether, 1,4-dioxane, 1,3-dioxolane, diethyl Carbitol, dibutyl Carbitol, 1,1,3-triethoxy hexane; and mineral oils, especially those having a boiling point ranging to as high as about 280° C.

The temperature of the reaction is not critical. However, it is preferable that the temperature, at atmospheric pressure, be within a range of from about 30° C. to about 150° C. Temperatures below 30° C. generally should not be used because the rate of reaction is unduly slow. Temperatures greater than about 150° C. are operable and are useful though generally such temperatures are unnecessary because no particularly significant advantage is obtained. Most preferably, the temperatures should range from about 70° C. to about 115° C.; temperatures from 100–115° C. having been found particularly suitable.

In conducting these reactions atmospheric pressure is most preferable. While pressures greater than atmospheric can be employed, such pressures tend to slow down the rate of reaction and therefore produce no particular advantage unless the increased pressure is desirable to provide a liquid state for the particular reactants and solvent used.

Having described the invention, what is claimed is:

1. Trimethyllead monomethyl ether of diethylene glycol, represented by the formula:

$$(CH_3)_3Pb\text{—}O\text{—}C_2H_4\text{—}O\text{—}C_2H_4\text{—}OCH_3$$

2. Triethyllead monomethyl ether of diethylene glycol, represented by the formula:

$$(C_2H_5)_3Pb\text{—}O\text{—}C_2H_4\text{—}O\text{—}C_2H_4\text{—}OCH_3$$

References Cited in the file of this patent

UNITED STATES PATENTS

| | | |
|---|---|---|
| 2,626,953 | Mack | Jan. 27, 1953 |
| 2,745,820 | Mack | May 15, 1956 |
| 2,980,633 | Koehler | Apr. 18, 1961 |
| 2,997,496 | Dörfelt et al. | Aug. 22, 1961 |

OTHER REFERENCES

Leeper et al.: Chemical Reviews, vol. 54, No. 1, February 1954, page 143.

UNITED STATES PATENT OFFICE
CERTIFICATE OF CORRECTION

Patent No. 3,147,293 September 1, 1964

Albert P. Giraitis et al.

It is hereby certified that error appears in the above numbered patent requiring correction and that the said Letters Patent should read as corrected below.

Column 1, line 46, after "tin" insert -- or --; column 4, line 10, for "$(CH_3)_3PbO[C_2H_4]_2CH_3$" read -- $(CH_3)_3PbO[C_2H_4O]_2CH_3$ --; line 15, for "Trimethyllead", in italics, read -- Triethyllead --, in italics.

Signed and sealed this 13th day of April 1965.

(SEAL)
Attest:

ERNEST W. SWIDER
Attesting Officer

EDWARD J. BRENNER
Commissioner of Patents